US012674014B2

(12) United States Patent
Park et al.

(10) Patent No.: US 12,674,014 B2
(45) Date of Patent: Jul. 7, 2026

(54) STABILIZER, POLYMER POLYOL PREPARED USING STABILIZER AND METHOD FOR PREPARING POLYMER POLYOL

(71) Applicant: KOREA KUMHO PETROCHEMICAL CO., LTD., Seoul (KR)

(72) Inventors: Jinwoo Park, Daejeon (KR); Gi Jung Kim, Pyeongtaek-si (KR); Seulgi Kim, Daejeon (KR); Dong Ho Kim, Daejeon (KR); Yejin Choi, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 741 days.

(21) Appl. No.: 18/015,591

(22) PCT Filed: Apr. 8, 2022

(86) PCT No.: PCT/KR2022/005124
§ 371 (c)(1),
(2) Date: Jan. 11, 2023

(87) PCT Pub. No.: WO2023/033290
PCT Pub. Date: Mar. 9, 2023

(65) Prior Publication Data
US 2024/0239943 A1 Jul. 18, 2024

(30) Foreign Application Priority Data

Aug. 30, 2021 (KR) ........................ 10-2021-0114631

(51) Int. Cl.
| | |
|---|---|
| C08G 18/08 | (2006.01) |
| C08G 18/09 | (2006.01) |
| C08G 18/34 | (2006.01) |
| C08G 18/40 | (2006.01) |
| C08G 18/48 | (2006.01) |
| C08G 18/62 | (2006.01) |
| C08G 18/63 | (2006.01) |
| C08G 18/76 | (2006.01) |

(52) U.S. Cl.
CPC ..... *C08G 18/0857* (2013.01); *C08G 18/0838* (2013.01); *C08G 18/092* (2013.01); *C08G 18/34* (2013.01); *C08G 18/4072* (2013.01); *C08G 18/48* (2013.01); *C08G 18/4833*
(2013.01); *C08G 18/6204* (2013.01); *C08G 18/622* (2013.01); *C08G 18/63* (2013.01); *C08G 18/632* (2013.01); *C08G 18/7671* (2013.01); *C08G 2110/0025* (2021.01)

(58) Field of Classification Search
CPC ........... C08G 18/0857; C08G 18/4833; C08G 18/622; C08G 18/092; C08G 18/4072; C08G 18/63; C08G 18/632; C08G 18/7671; C08G 18/0838; C08G 18/34; C08G 18/48; C08G 18/6204; C08G 2110/0025
See application file for complete search history.

(56) References Cited

U.S. PATENT DOCUMENTS

| | | | |
|---|---|---|---|
| 5,990,185 A | 11/1999 | Fogg | |
| 8,084,562 B2 | 12/2011 | Yasuda et al. | |
| 11,149,145 B2 | 10/2021 | Adkins et al. | |
| 11,434,319 B2 | 9/2022 | Kim et al. | |
| 2003/0004217 A1 | 1/2003 | Kawamoto et al. | |
| 2008/0287645 A1 | 11/2008 | Choi et al. | |
| 2019/0185666 A1* | 6/2019 | Adkins | C08J 9/228 |

FOREIGN PATENT DOCUMENTS

| | | | |
|---|---|---|---|
| JP | 63-146912 A | 6/1988 | |
| JP | 2021-507056 A | 2/2021 | |
| KR | 10-1999-0066959 A | 8/1999 | |
| KR | 10-2009-009113 A | 8/2009 | |
| KR | 10-1998849 B1 | 7/2019 | |
| WO | 2008/062790 A1 | 5/2008 | |

OTHER PUBLICATIONS

Office Action dated Dec. 19, 2023 issued in Korean Patent Application No. 10-2021-0114631.
International Search Report of PCT/KR2022/005124 dated Aug. 1, 2022 [PCT/ISA/210].

* cited by examiner

*Primary Examiner* — Patrick D Niland
(74) *Attorney, Agent, or Firm* — Sughrue Mion, PLLC

(57) ABSTRACT

Disclosed is a polymer polyol stabilizer, prepared by reacting: a polyol having a hydroxyl value of 5 to 100 mgKOH/g and containing ethylene oxide in an amount of 50 wt % or more; and a reactive unsaturated compound having one or more carbon-carbon double bonds and two or more carbon-oxygen double bonds, a polymer polyol polymerized by comprising the polymer polyol stabilizer, and a method for preparing the polymer polyol.

15 Claims, No Drawings

STABILIZER, POLYMER POLYOL PREPARED USING STABILIZER AND METHOD FOR PREPARING POLYMER POLYOL

CROSS REFERENCE TO RELATED APPLICATIONS

This application is a National Stage of International Application No. PCT/KR2022/005124, filed Apr. 8, 2022, claiming priority to Korean Patent Application No. 10-2021-0114631, filed Aug. 30, 2021, the entire disclosures of which are incorporated herein by reference.

TECHNICAL FIELD

The present disclosure relates to a polymer polyol using a stabilizer and a method for preparing the same.

BACKGROUND ART

A polymer polyols (POP), also called a copolymer polyol, is generally used to enhance the hardness and breathability of polyurethane. Recently, as the amount of polyurethane used for vehicle seats, furniture, etc., is on the rise, the demand for high solids content polymer polyols having excellent effect of enhancing the hardness of polyurethane with only a small amount is growing as well.

Conventional polymer polyols have been used for flexible polyurethane, and it was impossible to synthesize high solids content polymer polyols for rigid polyurethane. The dispersibility of the stabilizer was low in the base polyols when synthesizing polymer polyols, and thus the dispersion stability of styrene-acrylonitrile particles failed to reach a level required for the preparation of rigid polymer polyols.

Polymer polyols are prepared by mixing polymerizable monomers with a predetermined amount of base polyols and additionally feeding polyols for polymerization. Flexible polymer polyols and rigid polymer polyols are distinguished from each other according to the properties of polyols used when synthesizing. Conventional stabilizers used for preparing polymer polyols have low affinity with rigid polyols, and this makes styrene-acrylonitrile particles and rigid polyols separate from each other, eventually causing the aggregation of the styrene-acrylonitrile particles.

Stabilizers used for preparing polymer polyols need to have an affinity with polyols and suppress the aggregation of styrene-acrylonitrile particles. When preparing polymer polyols with stabilizers satisfying these two conditions, styrene-acrylonitrile particles formed by dispersion polymerization may be stably dispersed in polyols.

A technique had been attempted to overcome the above problem by synthesizing stabilizers using rigid polyols. However, these stabilizers did not satisfy functional groups and molecular weights to an extent to suppress the aggregation of styrene-acrylonitrile particles, and became non-polarized during the synthesizing process, which leads to the decrease in affinity with rigid polyols. Thus, the stabilizers could not be used for rigid, high solids content polymer polyols.

DETAILED DESCRIPTION OF INVENTION

Technical Task

The present disclosure aims at providing a rigid, high solids content polymer polyol and a method for preparing the same.

Means for Solving Technical Task

According to an aspect, a polymer polyol stabilizer, prepared by reacting: a polyol having a hydroxyl value of 5 to 100 mgKOH/g and containing ethylene oxide in an amount of 50 wt % or more; and a reactive unsaturated compound having one or more carbon-carbon double bonds and two or more carbon-oxygen double bonds, is provided.

In an embodiment, the polyol may be a polyether polyol having a hydroxyl value of 15 to 60 mgKOH/g and containing ethylene oxide in an amount of 55 to 85 wt %.

In an embodiment, the reactive unsaturated compound may be at least one selected from the group consisting of maleic acid, fumaric acid, maleic anhydride, itaconic acid, citraconic acid and citraconic anhydride.

According to another aspect, a polymer polyol, comprising: the polymer polyol stabilizer as described above; a polymer derived from an ethylenically unsaturated monomer; and a base polyol, is provided.

In an embodiment, the ethylenically unsaturated monomer may be a combination of an aromatic vinyl monomer and a vinyl cyanide-based monomer.

In an embodiment, the aromatic vinyl monomer and vinyl cyanide-based monomer may be polymerized in a weight ratio of 100:5 to 75.

In an embodiment, a polymer particle derived from the ethylenically unsaturated monomer having an average particle size of 0.5 to 3 μm may be dispersed.

In an embodiment, the base polyol may have a hydroxyl value of 200 to 800 mgKOH/g.

In an embodiment, the base polyol may have a viscosity at 25° C. of 200 to 10,000 cps.

In an embodiment, the solids content may be in a range of 30 to 55 wt %.

In an embodiment, the viscosity at 25° C. may be in a range of 3,000 to 50,000 cps According to another aspect, a method for preparing a polymer polyol, comprising: (a) mixing the polymer polyol stabilizer as described above, an ethylenically unsaturated monomer, an initiator and a base polyol to prepare a first mixture; (b) mixing a base polyol and a diluent to prepare a second mixture; and (c) feeding the first mixture to the second mixture to polymerize, is provided.

In an embodiment, the polymer polyol stabilizer may be contained in an amount of 1 to 10 parts by weight based on 100 parts by weight of the ethylenically unsaturated monomer in the first mixture.

In an embodiment, the weight ratio of the base polyol used in step (a) and (b) may be 1 to 5:1.

In an embodiment, step (c) may be performed at a temperature of 80 to 150° C.

Effect of Invention

According to an aspect, a rigid, high solids content polymer polyol and a method for preparing the same may be provided.

The effects of an aspect of the present invention are not limited to the above-mentioned effects, and it should be understood that the effects of the present invention include all effects that could be inferred from the configuration of the invention described in the detailed description of the invention or the appended claims.

BEST MODE FOR CARRYING OUT THE INVENTION

Hereinafter, an aspect of the present specification will be described with reference to specific embodiments. However, the description of the present specification may be implemented in various different forms, and thus is not limited to the embodiments described herein.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

When a range of numerical values is described herein, the value has the precision of the significant figures provided according to the standard rules in chemistry for significant figures, unless a specific range thereof is stated otherwise. For example, 10 includes a range of 5.0 to 14.9 and the number 10.0 includes a range of 9.50 to 10.49.

As used herein, the term "polymer polyol," also called a copolymer polyol, is a product in which a predetermined amount of a particulate organic or inorganic filler is dispersed in a base polyol in the liquid phase. A polyol produced by dispersing polymer particles in a polyether polyol and polymerizing the same is also a type of polymer polyol.

As used herein, the term "polyurethane" refers to a polymer material having a large amount of urethane (—NHCOO) bonds. Polyurethane is generally formed and processed into the form of foam that is a honeycomb-shaped light material through a polymer reaction generating bubbles. The term "polyurethane foam" is usually classified into flexible, rigid and semi-rigid types.

As used herein, the term "dispersion polymerization" is a type of polymerization process, which uses a solvent that is soluble in monomers but insoluble in prepared polymers, a polymerization stabilizer and a polymerization initiator, in which all components are dissolved in the single phase at the initial reaction, resulting polymers are precipitated as the polymerization proceeds, and a product having a particle diameter of hundreds of nanometers to tens of microns is obtained by using the polymerization stabilizer.

As used herein, the term "hydroxyl value (OH-Value, OHV)," also called a hydroxyl number, refers to the number of milligrams of potassium hydroxide (KOH) required to neutralize 1 g of a polyol, and is expressed as the unit of mgKOH/g. The hydroxyl value is measured by various methods. For example, the hydroxyl value may be analyzed using a near-infrared (NIR) spectrometer. The analysis may be carried out according to ASTM D6342 and ISO 15063.

Polymer Polyol Stabilizer

A polymer polyol stabilizer according to an aspect may be prepared by reacting: a polyol having a hydroxyl value of 5 to 100 mgKOH/g and containing ethylene oxide in an amount of 50 wt % or more; and a reactive unsaturated compound having one or more carbon-carbon double bonds and two or more carbon-oxygen double bonds.

The polymer polyol stabilizer is prepared using a hydrophilic polyol. The stabilizer may suppress the aggregation by improving the dispersion stability of polymer particles dispersed in a base polyol when synthesizing a rigid polymer polyol. Also, the stabilizer, which uses a hydrophilic polyol, has excellent affinity with a rigid polymer and may prevent the separation of polymer particles from the base polyol.

The polyol may have a hydroxyl value of 5 to 100 mgKOH/g, for example, 5 mgKOH/g, 10 mgKOH/g, 15 mgKOH/g, 20 mgKOH/g, 25 mgKOH/g, 30 mgKOH/g, 35 mgKOH/g, 40 mgKOH/g, 45 mgKOH/g, 50 mgKOH/g, 55 mgKOH/g, 60 mgKOH/g, 65 mgKOH/g, 70 mgKOH/g, 75 mgKOH/g, 80 mgKOH/g, 85 mgKOH/g, 90 mgKOH/g, 95 mgKOH/g, 100 mgKOH/g, or a value between any two of these values. When the hydroxyl value of the polyol deviates from the above range, the dispersion stability of polymer particles dispersed in the base polyol of the polymer polyol may decrease, or the aggregation may be generated due to excessive reaction.

The polyol may contain ethylene oxide in an amount of 50 wt % or more, for example, 50 wt %, 55 wt %, 60 wt %, 65 wt %, 70 wt %, 75 wt %, 80 wt %, 85 wt %, 90 wt %, 95 wt %, or a range between any two of these values. The content of ethylene oxide may refer to the ratio of the ethylene oxide compound fed when synthesizing the polyol. The polyol may be a polyether polyol prepared by adding ethylene oxide and propylene oxide to an initiator having two or more active hydrogens (—OH, —NH₂). When the ratio of ethylene oxide in the polyol satisfies the above range, the affinity with a rigid polyol may be improved thanks to excellent hydrophilicity.

Conventional stabilizers become non-polarized when the functional group and molecular weight are adjusted to improve the dispersion stability of polymer particles, and thus have a problem of reducing miscibility with rigid polyols. When such nonpolar stabilizers are used, phase separation may occur between polymer particles and rigid polyols. By comparison, the inventive polymer polyol stabilizer may exhibit polarity because it is prepared from a polyol rich in ethylene oxide. Also, the polyol may have the same properties as common polyols except for the content of ethylene oxide. Thus, double bonds may be given by using the same method as conventional stabilizers.

As an example, the polyol may be a polyether polyol having a hydroxyl value of 15 to 60 mgKOH/g and containing ethylene oxide in an amount of 55 to 85 wt % or more.

The reactive unsaturated compound may have one or more carbon-carbon double bonds and two or more carbon-oxygen double bonds. For example, the reactive unsaturated compound may be at least one selected from the group consisting of maleic acid, fumaric acid, maleic anhydride, itaconic acid, citraconic acid and citraconic anhydride. The reactive unsaturated compound may be contained in an amount of 1 to 5 parts by weight based on 100 parts by weight of the polyol. For example, the content may be 1 part by weight, 1.5 parts by weight, 2 parts by weight, 2.5 parts by weight, 3 parts by weight, 3.5 parts by weight, 4 parts by weight, 4.5 parts by weight, 5 parts by weight, or a range between any two of these values. When a stabilizer prepared by introducing a small amount of the reactive unsaturated compound into a polyol is used, the dispersion stability of a solids content may be improved when preparing a polymer polyol. As a result, a polymer polyol having a low viscosity and a high solids content may be prepared, and thereby the physical properties of a final product polyurethane may be further improved.

The stabilizer may be prepared by reacting a polyol and a reactive unsaturated compound in the presence of a catalyst. For the catalyst, an inorganic base such as hydroxides of alkali metals or alkaline earth metals, weak acids and bases of alkali metals or alkaline earth metals, and an organic base of quaternary ammonium hydroxide, 4-dimethylaminopyridine, 4-pyrrolidinopyridine, imidazole, etc., may be used, but the catalyst is not limited thereto.

The proper reaction temperature for preparing the stabilizer may be 80 to 150° C. The reaction may be carried out in a reactor that can perform stirring and pressurizing.

Polymer Polyol

A polymer polyol according to another aspect may comprise: the aforementioned polymer polyol stabilizer; a polymer derived from an ethylenically unsaturated monomer; and a base polyol.

The polymer polyol may be prepared by polymerizing at least one ethylenically unsaturated monomer dissolved in a rigid base polyol with a radical initiator. As a result, the polymer polyol may have a form in which polymer particles derived from the ethylenically unsaturated monomer are stably dispersed in the base polyol in the liquid phase. A polyurethane foam prepared using the polymer polyol may have excellent mechanical properties, insulating performance, demolding properties and compatibility with foaming agents.

For the radical initiator, an organic peroxide initiator such as t-butyl peroxy-2-ethylhexanoate, t-butyl perpivalate, t-amyl peroctoate, 2,5-dimethyl-hexane-2,5-di-per-2-ethyl-hexoate, t-butyl perneodecanoate, t-butyl perbenzoate, etc., or an azo initiator such as azobisisobutyronitrile (AIBN), azobismethylbutyronitrile (AMBN), etc., may be used The initiator may be contained in an amount of 0.1 to 2.5 parts by weight based on total 100 parts by weight of the monomers. When the content of the initiator deviates from the above range, the polymerization rate and dispersion stability may decrease.

The polymer polyol stabilizer has excellent dispersion stability for polymer particles derived from the ethylenically unsaturated monomer and excellent affinity with the base polyol, thereby preparing a rigid polymer polyol having a low viscosity and a high solids content.

The ethylenically unsaturated monomer may be a combination of an aromatic vinyl monomer and a vinyl cyanide-based monomer.

The aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethyl-aminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethyl ether, vinylpyridine, vinylxylene, diphenylethylene, diphenylethylene comprising a tertiary amine, styrene functionalized with a primary, secondary or tertiary amine, and derivatives thereof.

The vinyl cyanide-based monomer may be at least one selected from the group consisting of acrylonitrile, methacrylonitrile, ethacrylonitrile, and derivatives thereof.

The aromatic vinyl monomer and vinyl cyanide-based monomer may be polymerized in a weight ratio of 100:5 to 75. For example, based on 100 parts by weight of the aromatic vinyl monomer, the vinyl cyanide-based monomer may be polymerized in an amount of 5 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, or a range between any two of these values. When the weight ratio deviates from the above range, unnecessary colors may be added, the dispersion stability may decrease, the viscosity may excessively rise, or the scorching may occur in a final product.

The polymer derived from the ethylenically unsaturated monomer may have an average particle size of 0.5 to 3 μm, for example, 0.5 μm, 0.6 μm, 0.7 μm, 0.8 μm, 0.9 μm, 1.0 μm, 1.1 μm, 1.2 μm, 1.3 μm, 1.4 μm, 1.5 μm, 1.6 μm, 1.7 μm, 1.8 μm, 1.9 μm, 2.0 μm, 2.1 μm, 2.2 μm, 2.3 μm, 2.4 μm, 2.5 μm, 2.6 μm, 2.7 μm, 2.8 μm, 2.9 μm, 3.0 μm, or a range between any two of these values. In the polymer polyol, polymer particles having the above average particle size may be dispersed in the rigid base polyol in the liquid phase without forming aggregation.

For the base polyol, a polyether polyol which is prepared by the addition polymerization of alkylene oxides such as ethylene oxide, propylene oxide, butylene oxide, etc., with polyhydric alcohols such as ethylene glycol, glycerin, trimethylolpropane, pentaerythritol, sorbitol, sugar, etc., or amines such as triethanolamine, ethylenediamine, toluenediamine, etc., may be used, but in the case of a rigid polyol, it is not limited thereto.

The base polyol may have a hydroxyl value of 200 to 800 mgKOH/g, for example, 200 mgKOH/g, 210 mgKOH/g, 220 mgKOH/g, 230 mgKOH/g, 240 mgKOH/g, 250 mgKOH/g, 260 mgKOH/g, 270 mgKOH/g, 280 mgKOH/g, 290 mgKOH/g, 300 mgKOH/g, 310 mgKOH/g, 320 mgKOH/g, 330 mgKOH/g, 340 mgKOH/g, 350 mgKOH/g, 360 mgKOH/g, 370 mgKOH/g, 380 mgKOH/g, 390 mgKOH/g, 400 mgKOH/g, 410 mgKOH/g, 420 mgKOH/g, 430 mgKOH/g, 440 mgKOH/g, 450 mgKOH/g, 460 mgKOH/g, 470 mgKOH/g, 480 mgKOH/g, 490 mgKOH/g, 500 mgKOH/g, 510 mgKOH/g, 520 mgKOH/g, 530 mgKOH/g, 540 mgKOH/g, 550 mgKOH/g, 560 mgKOH/g, 570 mgKOH/g, 580 mgKOH/g, 590 mgKOH/g, 600 mgKOH/g, 610 mgKOH/g, 620 mgKOH/g, 630 mgKOH/g, 640 mgKOH/g, 650 mgKOH/g, 660 6 mgKOH/g, 670 mgKOH/g, 680 mgKOH/g, 690 mgKOH/g, 700 mgKOH/g, 710 mgKOH/g, 720 mgKOH/g, 730 mgKOH/g, 740 mgKOH/g, 750 mgKOH/g, 760 mgKOH/g, 770 mgKOH/g, 780 mgKOH/g, 790 mgKOH/g, 800 mgKOH/g, or a range between any two of these values. When the hydroxyl value of the polyol deviates from the above range, the aggregation of polymer polyols may be generated, or it would be difficult to use the polymer polyol for rigid use.

The base polyol may have a viscosity at 25° C. of 200 to 10,000 cps, for example, 200 cps, 225 cps, 250 cps, 275 cps, 300 cps, 325 cps, 350 cps, 375 cps, 400 cps, 425 cps, 450 cps, 475 cps, 500 cps, 525 cps, 550 cps, 575 cps, 600 cps, 625 cps, 650 cps, 675 cps, 700 cps, 725 cps, 750 cps, 775 cps, 800 cps, 825 cps, 850 cps, 875 cps, 900 cps, 925 cps, 950 cps, 975 cps, 1000 cps, 1,100 cps, 1,200 cps, 1,300 cps, 1,400 cps, 1,500 cps, 1,600 cps, 1,700 cps, 1,800 cps, 1,900 cps, 2,000 cps, 2,100 cps, 2,200 cps, 2,300 cps, 2,400 cps, 2,500 cps, 2,600 cps, 2,700 cps, 2,800 cps, 2,900 cps, 3,000 cps, 3,100 cps, 3,200 cps, 3,300 cps, 3,400 cps, 3,500 cps, 3,600 cps, 3,700 cps, 3,800 cps, 3,900 cps, 4,000 cps, 4,100 cps, 4,200 cps, 4,300 cps, 4,400 cps, 4,500 cps, 4,600 cps, 4,700 cps, 4,800 cps, 4,900 cps, 5,000 cps, 5,100 cps, 5,200 cps, 5,300 cps, 5,400 cps, 5,500 cps, 5,600 cps, 5,700 cps, 5,800 cps, 5,900 cps, 6,000 cps, 6,100 cps, 6,200 cps, 6,300 cps, 6,400 cps, 6,500 cps, 6,600 cps, 6,700 cps, 6,800 cps, 6,900 cps, 7,000 cps, 7,100 cps, 7,200 cps, 7,300 cps, 7,400 cps, 7,500 cps, 7,600 cps, 7,700 cps, 7,800 cps, 7,900 cps, 8,000 cps, 8,100 cps, 8,200 cps, 8,300 cps, 8,400 cps, 8,500 cps, 8,600 cps, 8,700 cps, 8,800 cps, 8,900 cps, 9,000 cps, 9,100 cps, 9,200 cps, 9,300 cps, 9,400 cps, 9,500 cps, 9,600 cps, 9,700 cps, 9,800 cps, 9,900 cps, 10,000 cps, or a range between any two of these values. When the viscosity of the base polyol deviates from the above range, the viscosity sharply rises when preparing a polymer polyol, and thus a high solids content may not be increased or it would be difficult to prepare polyurethane.

A molecular weight regulator or a diluent may be further comprised when preparing the polymer polyol. For example, alcohols such as methanol, ethanol, isopropanol, butanol, etc., mercaptans such as ethanethiol, heptanethiol, octanethiol, dodecanethiol, etc., toluene, ethylbenzene, xylene, etc., may be used.

The solids content of the polymer polyol may be in a range of 30 to 55 wt %, for example, 30 wt %, 32.5 wt %, 35 wt %, 37.5 wt %, 40 wt %, 42.5 wt %, 45 wt %, 47.5 wt %, 50 wt %, 52.5 wt %, 55 wt %, or a range between any two of these values. When the solids content deviates the above range, the final product may have poor physical properties, or the aggregation of polymer polyols may be generated.

The viscosity at 25° C. of the polymer polyol may be in a range of 3,000 to 50,000 cps, for example, 3,000 cps, 3,250 cps, 3,500 cps, 3,750 cps, 4,000 cps, 4,250 cps, 4,500 cps, 4,750 cps, 5,000 cps, 5,250 cps, 5,500 cps, 5,750 cps, 6,000 cps, 6,250 cps, 6,500 cps, 6,750 cps, 7,000 cps, 7,250 cps, 7,500 cps, 7,750 cps, 8,000 cps, 8,250 cps, 8,500 cps, 8,750 cps, 9,000 cps, 9,250 7 cps, 9,500 cps, 9,750 cps, 10,000 cps, 10,500 cps, 11,000 cps, 11,500 cps, 12,000 cps, 12,500 cps, 13,000 cps, 13,500 cps, 14,000 cps, 14,500 cps, 15,000 cps, 15,500 cps, 16,000 cps, 16,500 cps, 17,000 cps, 17,500 cps, 18,000 cps, 18,500 cps, 19,000 cps, 19,500 cps, 20,000 cps, 20,500 cps, 21,000 cps, 21,500 cps, 22,000 cps, 22,500 cps, 23,000 cps, 23,500 cps, 24,000 cps, 24,500 cps, 25,000 cps, 25,500 cps, 26,000 cps, 26,500 cps, 27,000 cps, 27,500 cps, 28,000 cps, 28,500 cps, 29,000 cps, 29,500 cps, 30,000 cps, 30,500 cps, 31,000 cps, 31,500 cps, 32,000 cps, 32,500 cps, 33,000 cps, 33,500 cps, 34,000 cps, 34,500 cps, 35,000 cps, 35,500 cps, 36,000 cps, 36,500 cps, 37,000 cps, 37,500 cps, 38,000 cps, 38,500 cps, 39,000 cps, 39,500 cps, 40,000 cps, 40,500 cps, 41,000 cps, 41,500 cps, 42,000 cps, 42,500 cps, 43,000 cps, 43,500 cps, 44,000 cps, 44,500 cps, 45,000 cps, 45,500 cps, 46,000 cps, 46,500 cps, 47,000 cps, 47,500 cps, 48,000 cps, 48,500 cps, 49,000 cps, 49,500 cps, 50,000 cps, or a range between any two of these values. When the viscosity deviates from the above range, the aggregation may be generated or the miscibility with isocyanate may be poor, and thus it would be impossible to prepare a product.

For the polymer polyol, part or all of rigid polyols may be replaced in known rigid polyurethane systems, for use. Alternatively, part or all of polyols may be replaced in known flexible polyurethane systems and then used for preparing rigid polyurethane. The polyurethane system may further comprise an additive such as a surfactant, a catalyst, a foaming agent, a cross-linking agent, etc., in addition to a polyol. Any known materials may be used for the additive.

The polymer polyol may be used for preparing a rigid polyurethane foam. The use of the rigid polymer polyol may further improve mechanical properties, insulating performance, demolding properties and compatibility with foaming agents, than the use of common rigid polyols. A rigid polyurethane foam, to which the polymer polyol is applied, has polymer particles dispersed effectively, and has improved mechanical properties such as vertical compression strength. In addition, when the polymer particles foam, the nucleus formation is promoted, and the cell size is reduced, thereby improving insulating performance. When the polymer polyol is used, the foaming agent such as cyclopentane may be impregnated, thereby having excellent maintenance of insulating performance.

The introduction of the polymer polyol may induce the non-polarization of the rigid polyurethane system, thereby improving compatibility with the foaming agent, and improve the open-type properties of a final product cell, thereby mitigating the bulging and obtaining excellent demolding properties of the foam.

Method for Preparing Polymer Polyol

A method for preparing a polymer polyol according to another aspect may comprise: (a) mixing the aforementioned polymer polyol stabilizer, an ethylenically unsaturated monomer, an initiator and a base polyol to prepare a first mixture; (b) mixing a base polyol and a diluent to prepare a second mixture; and (c) feeding the first mixture to the second mixture to polymerize. Steps (a) and (b) may be performed simultaneously or sequentially, and the order is not limited.

The features of the polymer polyol stabilizer, ethylenically unsaturated monomer, initiator and base polyol are as described above.

In step (a), the monomer, initiator, stabilizer, polyol, etc. may be mixed to prepare a first mixture. Particularly, in step (a), the ethylenically unsaturated monomer may be dissolved in the base polyol.

The first mixture may contain the polymer polyol stabilizer in an amount of 1 to 10 parts by weight based on 100 parts by weight of the ethylenically unsaturated monomer. For example, based on 100 parts by weight of the ethylenically unsaturated monomer, the content of the polymer polyol stabilizer may be 1 part by weight, 1.5 parts by weight, 2 parts by weight, 2.5 parts by weight, 3 parts by weight, 3.5 parts by weight, 4 parts by weight, 4.5 parts by weight, 5 parts by weight, 5.5 parts by weight, 6 parts by weight, 6.5 parts by weight, 7 parts by weight, 7.5 parts by weight, 8 parts by weight, 8.5 parts by weight, 9 parts by weight, 9.5 parts by weight, 10 parts by weight, or a range between any two of these values. When the content deviates from the above range, the aggregation of polymer particles may be generated, or the solids content may not reach a required level.

Step (b) may be a step of preparing the synthesis of a polymer polyol by raising the temperature of the reactor while mixing some of the raw materials. For example, step (b) may be performed by mixing remaining polyol, excluding the polyol used in step (a), with a diluent.

The weight ratio of the base polyol used in steps (a) and (b) may be 1 to 5:1. For example, when in step (a), the base polyol is used in an amount of 1 part by weight, 1.5 parts by weight, 2 parts by weight, 2.5 parts by weight, 3 parts by weight, 3.5 parts by weight, 4 parts by weight, 4.5 parts by weight, 5 parts by weight, or a range between any two of these values, in step (b), the base 5 polyol may be used in an amount of 1 part by weight.

Step (c) may be a step of performing polymerization by feeding the first mixture in which the ethylenically unsaturated monomer is dissolved in the base polyol into the second mixture in which the base polyol and diluent are mixed. Step (c) may be performed at a temperature of 80 20 to 150° C., for example, 80° C., 85° C., 90° C., 95° C., 100° C., 105° C., 110° C., 115° C., 120° C., 125° C., 130° C., 135° C., 140° C., 145° C., 150° C., or a range between any two of these values. Step (c) may be performed while keeping stirring.

In step (c), the feeding of the first mixture may be continuously performed for 1 to 30 hours. When the feeding is excessively fast, the dispersion stability of polymer particles may decrease, and when it is excessively slow, it may be disadvantageous in terms of economic feasibility.

After the polymerization of step (c), the aging may be performed at a temperature the same as the polymerization temperature or higher for 1 to 10 hours. Through the aging process, polymer particles inside the polyol may be stably dispersed.

After the aging process, a degassing process may be performed to remove unreacted monomers and other additives. The degassing process may be performed by any known methods.

Hereinafter, embodiments of the present specification will be described in more detail. However, the following experimental results describe only representative experimental results among the above examples, and the scope and content of the present specification may not be construed as narrowed or limited by the examples. Each effect of the various embodiments of the present specification not explicitly presented below will be specifically described in the corresponding section.

Example 1

1000 parts by weight of polyol having OHV 34 mgKOH/g and 80 wt % of ethylene oxide, 29.4 parts by weight of maleic anhydride, and 1 part by weight of sodium hydroxide were fed into a reactor. The mixture was stirred under the conditions of 130° C. and 200 rpm for 14 hours, to prepare a hydrophilic stabilizer.

458.5 parts by weight of styrene and 196.5 parts by weight of acrylonitrile, as monomers, 9.8 parts by weight of an initiator azobisisobutyronitrile and 49.1 parts by weight of the hydrophilic stabilizer were completely dissolved in a 4 L continuous addition tank equipped with a stirrer. 733.4 parts by weight of a rigid base polyol having OHV 360 mgKOH/g and viscosity of 350 cps (25° C.) was fed into the continuous addition tank and stirred for 5 minutes, to prepare a continuous addition mixture.

200 parts by weight of a rigid base polyol was fed into a 4 L batch reaction tank equipped with a stirrer. 245.6 parts by weight of ethylbenzene was added to the reaction tank to be completely dissolved. The temperature of the reactant was raised to 120° C. for 1 hour while stirring at a rate of 250 rpm. When the internal temperature of the reactor reached 120° C., the continuous addition mixture was continuously fed at the same rate for 5 hours. The temperature and stirring conditions of the reaction tank were maintained at 120° C. and 250 rpm. After completion of the feeding of the continuous addition mixture, the temperature was raised to 130° C. and the mixture was aged for 2 hours.

The polymerizate which had been polymerized and aged was transferred to a purification tank and vacuum degassed at a temperature of 120° C. for 20 hours to remove the unreacted monomers and ethylbenzene which were dissolved in the polymerizate, to obtain a rigid polymer polyol.

Example 2

A rigid polymer polyol was prepared in the same manner as in Example 1 except that a polyol having OHV 34 mgKOH/g and 60 wt % of ethylene oxide (EO) was used when preparing a hydrophilic stabilizer.

Example 3

A rigid polymer polyol was prepared in the same manner as in Example 1 except that 573.1 parts by weight of styrene, 245.6 parts by weight of acrylonitrile, 12.3 parts by weight of azobisisobutyronitrile, 61.4 parts by weight of a hydrophilic stabilizer, 557.3 parts by weight of a rigid base polyol were fed into the continuous addition mixture.

Example 4

A polymer polyol was prepared in the same manner as in Example 1 except that a polyol having OHV 280 mgKOH/g and viscosity of 250 cps)(25° C. was used as a base polyol.

Example 5

A rigid polymer polyol was prepared in the same manner as in Example 1 except that a polyol having OHV 56 mgKOH/g and 80 wt % of ethylene oxide (EO) was used when preparing a hydrophilic stabilizer.

Comparative Example 1

A polymer polyol was prepared in the same manner as in Example 1 except that a polyol having OHV 56 mgKOH/g and viscosity of 500 cps)(25° C. was used as a base polyol.

Comparative Example 2

A polymer polyol was prepared in the same manner as in Example 1 except that a polyol having OHV 34 mgKOH/g and viscosity of 850 cps (25° C.) was used as a base polyol.

Comparative Example 3

A polymer polyol was prepared in the same manner as in Example 1 except that a stabilizer prepared from a polyol having OHV 34 mgKOH/g and 0 wt % of ethylene oxide (EO) was used, instead of a hydrophilic stabilizer.

Comparative Example 4

A polymer polyol was prepared in the same manner as in Example 1 except that a stabilizer prepared from a polyol having OHV 34 mgKOH/g and 10 wt % of ethylene oxide (EO) was used, instead of a hydrophilic stabilizer.

Comparative Example 5

A polymer polyol was prepared in the same manner as in Example 1 except that a stabilizer prepared from a polyol having OHV 360 mgKOH/g and 0 wt % of ethylene oxide (EO) was used, instead of a hydrophilic stabilizer.

Comparative Example 6

A polymer polyol was prepared in the same manner as in Example 1 except that a stabilizer prepared from a polyol having OHV 360 mgKOH/g and 10 wt % of ethylene oxide (EO) was used, instead of a hydrophilic stabilizer.

Comparative Example 7

A polymer polyol was prepared in the same manner as in Example 1 except that a stabilizer prepared from a polyol having OHV 360 mgKOH/g and 80 wt % of ethylene oxide (EO) was used, instead of a hydrophilic stabilizer.

The properties of the products prepared in the examples and comparative examples are shown in Table 1 below.

TABLE 1

| | Stabilizer | | Polymer polyol (POP) | | | | | |
| | Polyol OHV (mgKOH/g) | Polyol EO content (wt %) | Base polyol OHV (mgKOH/g) | Base polyol viscosity (cps@25° C.) | POP quality | POP solids content (wt %) | POP viscosity (cps@25° C.) | POP particle size (μm) |
|---|---|---|---|---|---|---|---|---|
| Ex. 1 | 34 | 80 | 360 | 350 | Good | 40.23 | 5,050 | 1.2 |
| Ex. 2 | 34 | 60 | 360 | 350 | Good | 40.68 | 5,200 | 1.3 |
| Ex. 3 | 34 | 80 | 360 | 350 | Good | 50.37 | 28,000 | 2.1 |
| Ex. 4 | 34 | 80 | 280 | 250 | Good | 39.88 | 4,000 | 1.2 |
| Ex. 5 | 56 | 80 | 360 | 350 | Good | 40.33 | 12,300 | 1.6 |
| Comp. Ex. 1 | 34 | 80 | 56 | 500 | Aggregation | Not rated | Not rated | Not rated |
| Comp. Ex. 2 | 34 | 80 | 34 | 850 | Aggregation | Not rated | Not rated | Not rated |
| Comp. Ex. 3 | 34 | 0 | 360 | 350 | Aggregation | Not rated | Not rated | Not rated |
| Comp. Ex. 4 | 34 | 10 | 360 | 350 | Aggregation | Not rated | Not rated | Not rated |
| Comp. Ex. 5 | 360 | 0 | 360 | 350 | Aggregation | Not rated | Not rated | Not rated |
| Comp. Ex. 6 | 360 | 10 | 360 | 350 | Aggregation | Not rated | Not rated | Not rated |
| Comp. Ex. 7 | 360 | 80 | 360 | 350 | Aggregation | Not rated | Not rated | Not rated |

Experimental Example 1

The rigid polymer polyol synthesized in example 1 was reacted with isocyanate and applied to a rigid polyurethane system. Then, the case was compared with a case where a polymer polyol was not used. The rigid polyurethane system is as shown in Table 2 below:

TABLE 2

| — | Control group | Example 1 |
|---|---|---|
| Rigid polyol mixture | 100 | 80 |
| Rigid polymer polyol | 0 | 20 |
| Surfactant | 5 | 5 |
| Saturated catalyst | 0.5 | 0.5 |
| Resin catalyst | 0.2 | 0.2 |
| Trimerization catalyst | 0.9 | 0.9 |
| Chemical foaming agent | 2.40 | 2.40 |
| Physical foaming agent | 17.55 | 17.55 |

(unit: parts by weight)

The foaming of a rigid polyurethane foam was carried out using the rigid polyurethane system according to Table 2 and 4,4'-methylenediphenyl diisocyanate (MDI) in a weight ratio of 100:120, and the evaluation results are as shown in Table 3 below.

TABLE 3

| | Control group | Example 1 |
|---|---|---|
| Heat conductivity (kcal/mhr ° C.) | 179.9 | 179.5 |
| Vertical compression strength (kgf/cm²) | 1.53 | 1.47 |
| Pressure strain (%) | 22.33 | 16.71 |
| Post expansion (%) | 4.82 | 4.49 |

As a result of foam evaluation, it was confirmed that when using the rigid, high solids content polymer polyol of the example, the insulating performance was improved without degrading the mechanical properties such as hardness, and the bulging was mitigated. It is determined that the insulating performance was improved because the foaming agent was impregnated into styrene-acrylonitrile particles. In addition, it is determined that the bulging was mitigated, and thus the post expansion was reduced, and accordingly the demolding properties of the foam are excellent.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

What is claimed is:

1. A polymer polyol stabilizer, prepared by reacting:
   a polyol having a hydroxyl value of 5 to 100 mgKOH/g and containing ethylene oxide in an amount of 55 to 85 wt; and
   a reactive unsaturated compound having one or more carbon-carbon double bonds and two or more carbon-oxygen double bonds.

2. The polymer polyol stabilizer of claim 1, wherein the polyol is a polyether polyol having a hydroxyl value of 15 to 60 mgKOH/g.

3. The polymer polyol stabilizer of claim 1, wherein the reactive unsaturated compound is at least one selected from the group consisting of maleic acid, fumaric acid, maleic anhydride, itaconic acid, citraconic acid and citraconic anhydride.

4. A polymer polyol, comprising:
   the polymer polyol stabilizer according to claim 1;
   a polymer derived from an ethylenically unsaturated monomer; and
   a base polyol.

5. The polymer polyol of claim 4, wherein the ethylenically unsaturated monomer is a combination of an aromatic vinyl monomer and a vinyl cyanide-based monomer.

6. The polymer polyol of claim 5, wherein the aromatic vinyl monomer and vinyl cyanide-based monomer are polymerized in a weight ratio of 100:5 to 75.

7. The polymer polyol of claim 4, wherein a polymer particle derived from the ethylenically unsaturated monomer having a volume-average particle diameter of 0.5 to 3 μm is dispersed.

8. The polymer polyol of claim 4, wherein the base polyol has a hydroxyl value of 200 to 800 mgKOH/g.

9. The polymer polyol of claim 4, wherein the base polyol has a viscosity at 25° C. of 200 to 10,000 cps.

10. The polymer polyol of claim 4, wherein the solids content is in a range of 30 to 55 wt %.

11. The polymer polyol of claim 4, wherein the viscosity at 25° C. is in a range of 3,000 to 50,000 cps.

12. A method for preparing a polymer polyol, comprising:
   (a) mixing the polymer polyol stabilizer according to claim 1, an ethylenically unsaturated monomer, an initiator and a base polyol to prepare a first mixture;
   (b) mixing a base polyol and a diluent to prepare a second mixture; and
   (c) feeding the first mixture to the second mixture to polymerize.

13. The method of claim 12, wherein the polymer polyol stabilizer is contained in an amount of 1 to 10 parts by weight based on 100 parts by weight of the ethylenically unsaturated monomer in the first mixture.

14. The method of claim 12, wherein the weight ratio of the base polyol used in steps (a) and (b) is 1 to 5:1.

15. The method of claim 12, wherein step (c) is performed at a temperature of 80 to 150° C.

* * * * *